Figure 1:
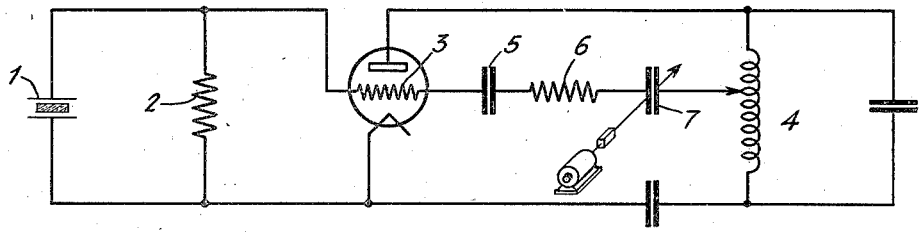

April 6, 1937.  R. BECHMANN ET AL  2,076,289

FREQUENCY MODULATION

Original Filed Nov. 10, 1933

INVENTOR
RUDOLF BUCHMANN
HERBERT ELSTERMANN
BY
ATTORNEY

Patented Apr. 6, 1937

2,076,289

UNITED STATES PATENT OFFICE 2,076,289

FREQUENCY MODULATION

Rudolf Bechmann and Herbert Elstermann, Berlin, Germany, assignors to Telefunken Gesellschaft für Drahtlose Telegraphie m. b. H., Berlin, Germany, a corporation of Germany Application November 10, 1933, Serial No. 697,398
Renewed April 8, 1935. In Germany November 21, 1932

11 Claims. (Cl. 179—171)

The present invention relates to a circuit for wobbling, i. e., for the production of a small periodical frequency change of oscillations of a crystal controlled transmitter of the Cady-Pierce type in which the piezo-electric crystal is placed between the grid and cathode of the oscillating tube. It is known in the art to produce the frequency change by parallel- or series-connection of a variable condenser to the oscillating crystal whose frequency is to be changed. Hereby is the natural oscillation of the crystal in the circuit essentially changed. At the same time, however, a change of the load on the quartz occurs which may easily cause instabilities of the produced oscillations.

The present invention consists of circuits which do not present the disadvantage residing in the load variation of the crystal. These circuits accordingly afford a greater stability of the wobbled oscillations. Several embodiments of circuits including the novel feature of my invention are shown by way of example in Figures 1 to 4 inclusive of the drawing. Each of these modifications include means for generating oscillations including a piezo-electric crystal, a thermionic oscillator controlled thereby and means for wobbling the frequency of the oscillations produced in said oscillator without placing a variable load on said piezo-electric crystal.

Figure 2:
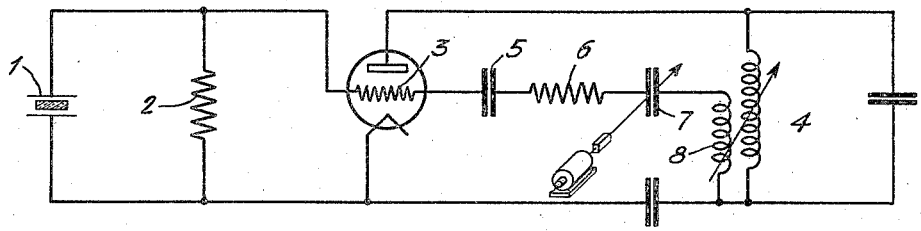

The piezo electric crystal 1 to which the grid leak resistance 2 is connected in parallel, is placed between grid and cathode of an oscillating tube 3 whose plate to cathode circuit contains the oscillatory circuit 4. A phase displaced alternating potential is furthermore applied to the control grid. This phase displaced alternating current potential may, for instance, be supplied from the plate circuit of the transmitter as shown. To this end, the grid of tube 3 is connected to a point on the coil of the plate circuit, by way of a blocking condenser 5, a resistance 6, serving for limiting the amplitude, and a wobble condenser 7. By a wobble condenser I mean a condenser whose capacity is periodically variable. The condenser may be driven by a motor as shown. In place of the capacitive coupling as shown in Figure 1, an inductive coupling between the grid circuit and the plate circuit by means of coupling coil 8 may be provided as indicated in Figure 2.

At variation of the wobble condenser 7 the alternating voltage amplitude applied to the grid remains practically constant and it is only the phase thereof which changes in respect to the crystal oscillation; in order to restore the phase balance, the intended frequency change occurs.

Figure 3:
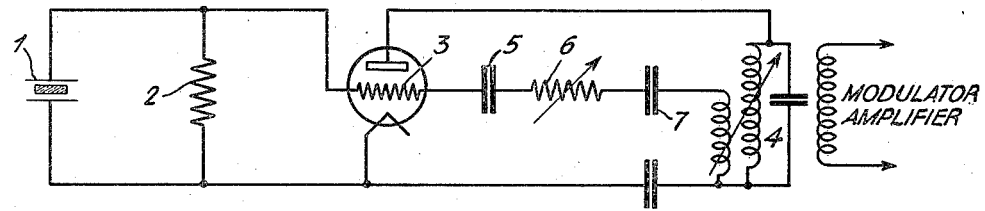
Figure 4:
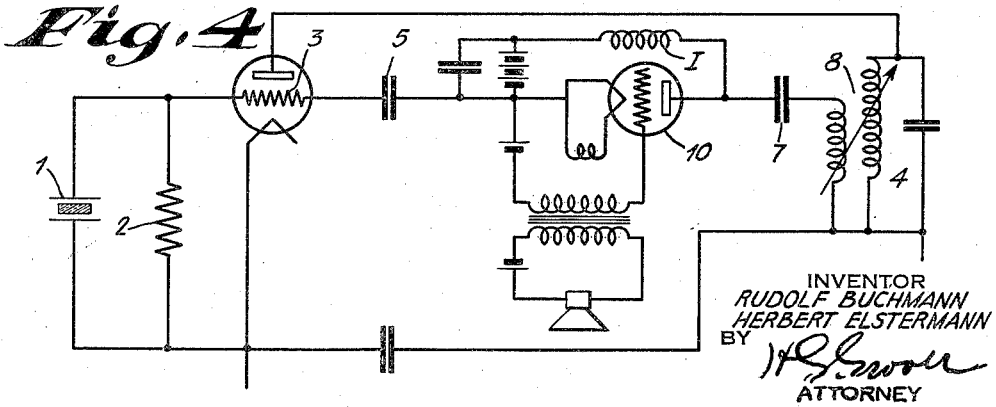

In using the same circuits it is also possible to maintain the phase displacements between the alternating voltage and the crystal oscillation at an unchanged value, by giving the condenser 7 a fixed value and by periodically changing the resistance 6, as shown in Figure 3, by small values whereby the desired frequency change is obtained. Of course, condensers 5 and 7 may be replaced here by a single condenser.

A resistance particularly suited for this purpose is presented by the cathode anode path of a three or multi-electrode tube whose resistance is changed by means of an alternating grid voltage in the rhythm of the wobble frequency. Such an arrangement has been shown in Figure 4, wherein the anode to cathode impedance of the tube 10 is connected, as shown, with the grid of tube 3. The modulating potentials are applied, as shown, to the input electrodes of tube 10.

The change of the amplitude of the alternating potential applied to the control grid of tube 3 can also be obtained by means of a periodical change of the degree of coupling between the oscillatory circuit 4 and coil 8. In this case due to the variation of the mutual inductance, also a certain phase change occurs simultaneously.

In particular it is worth noticing and is also confirmed by experimental investigations that the load of the crystal in the indicated circuits remains practically unchanged and that thus a favorable stabilization of the wobbled oscillation is attained.

Having thus described our invention and the operation thereof, what we claim is:

1. In a system for producing frequency modulated high frequency oscillations, a thermionic oscillation generator tube having an anode, a cathode and a control grid, a piezo-electric frequency control device connected between the control grid and cathode of said tube, an oscillation circuit connected between the anode and cathode of said tube, a separate circuit connecting said oscillation circuit to said control grid to transfer from said oscillation circuit to said control grid exciting potentials of substantially constant alternating current amplitude and of phase displaced relation with respect to the alternating current potentials on said control grid, whereby oscillations of a substantially constant frequency as determined by said piezo-electric crystal are developed in said tube and circuits, and means for periodically shifting the frequency of said oscillations without changing the potential difference across said piezo-electric crystal comprising a variable impedance in said separate circuit.

2. Signaling means, as recited in claim 1, in which said last named means is a continuously variable impedance in said separate circuit.

3. Signaling means, as recited in claim 1, in which said last named means is a continuously variable reactance in series in said separate circuit.

4. Signaling means, as recited in claim 1, in which said separate circuit includes a blocking condenser and a limiting resistance in series, and in which said last named means is a continuously variable capacity in series with said resistance.

5. Signaling means, as recited in claim 1, in which said oscillation circuit includes an inductance, and in which said separate circuit includes a limiting resistance and an inductance variably coupled to said inductance in said oscillation circuit.

6. Signaling means, as recited in claim 1, in which said oscillation circuit includes an inductance, and in which said separate circuit includes the anode to cathode impedance of a thermionic tube and an inductance in series, said inductance being coupled to the inductance in said oscillation circuit, and in which said last named means comprises a source of modulating potentials connected with the control electrode and cathode of the thermionic tube, the anode to cathode impedance of which is in series in said separate circuit.

7. In a system for producing high frequency oscillations and modulating the frequency thereof, an oscillation generator tube having an anode, a cathode and a control grid, a frequency controlling and stabilizing circuit including a piezo electric crystal connected between the control grid and cathode of said tube, an output circuit tuned to the mean frequency of said generator connected between the anode and cathode of said tube, a separate capacitive element having two terminals one of which is connected with said frequency controlling circuit, means for feeding voltages from said output circuit to the other terminal of said separate capacitive element, and means responsive to signaling waves for varying the phase and amplitude of the voltages fed to said other terminal of said capacitive element, thereby varying the frequency of the energy appearing in said output circuit.

8. In a system for producing high frequency oscillations and modulating the frequency of the same, an oscillation generator tube having an anode, a cathode and a control grid, a frequency controlling circuit including a piezo electric crystal connected between the control grid and cathode of said tube, a high frequency output circuit, tuned to the mean frequency of the oscillation generated, connected between the anode and cathode of said tube, a separate reactive element associated with said frequency controlling circuit, means for feeding voltages from said output circuit to said separate reactive element, and an impedance in said means for periodically shifting the phase of the voltages fed to said separate reactive element, whereby the effective reactance of said frequency controlling circuit is varied, thereby varying the frequency of the energy appearing in said high frequency output circuit.

9. In a frequency modulation system, an oscillation generator tube having an anode, a cathode and a control grid, a frequency controlling and stabilizing circuit connected between said control grid and cathode, a parallel capacity and inductance connected in a high frequency output circuit between said anode and cathode, a separate reactive element having two terminals, means connecting one of said terminals to said frequency controlling circuit, a variable impedance coupling the other terminal of said separate reactive element to said output circuit, and means for varying said impedance at signal frequency, whereby the frequency of the oscillations generated may be varied in accordance with signals.

10. In a frequency modulation system, an oscillation generator tube having an anode, a cathode and a control grid, a frequency controlling circuit including a piezo-electric crystal connected between said control grid and cathode, a parallel capacity and inductance connected in a high frequency output circuit between said anode and cathode and tuned to the frequency of the oscillations to be generated, a reactive element connected to said frequency controlling circuit, a second inductance coupled to the inductance in said output circuit, and a variable impedance coupling said second inductance to said separate reactive element.

11. In a frequency modulator, a thermionic tube having an anode, a cathode and a control grid, a frequency determining circuit comprising a piezo-electric crystal connected between the control grid and cathode of said tube, an output circuit including an inductance and a parallel capacity connected between the anode and cathode of said tube, a second inductance coupled to said first named inductance, a reactive element coupled to the control grid of said tube, a second thermionic tube, a circuit connected the impedance of said second thermionic tube between said second named inductance and said reactive element, and a source of modulating potentials connected to said second named tube.

RUDOLPH BECHMANN.
HERBERT ELSTERMANN.